No. 812,587. PATENTED FEB. 13, 1906.
G. C. McFARLANE.
MERIDIAN TRANSFER APPARATUS.
APPLICATION FILED OCT. 17, 1903.
2 SHEETS—SHEET 1.
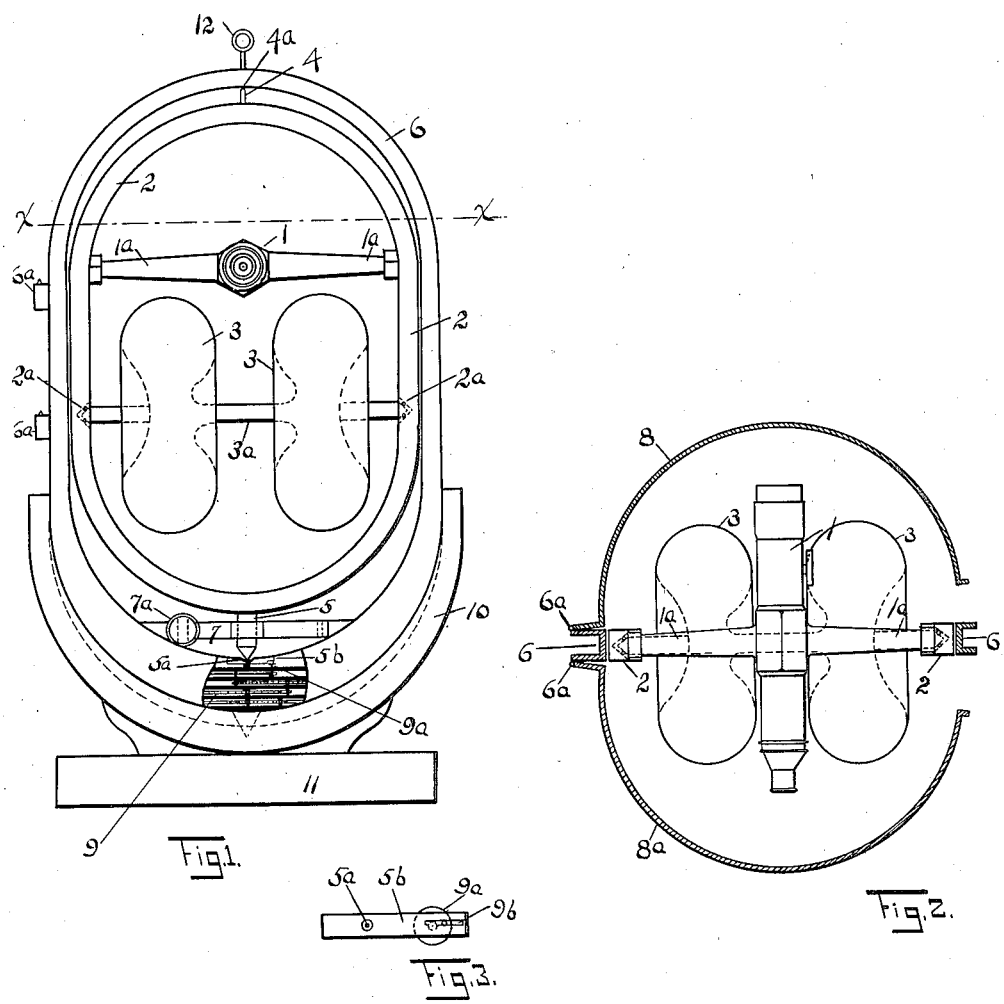
WITNESSES:
W. I. Cathcart
A. A. Easterly
INVENTOR
George C. McFarlane
BY
Geo. B. Willey ATTORNEY

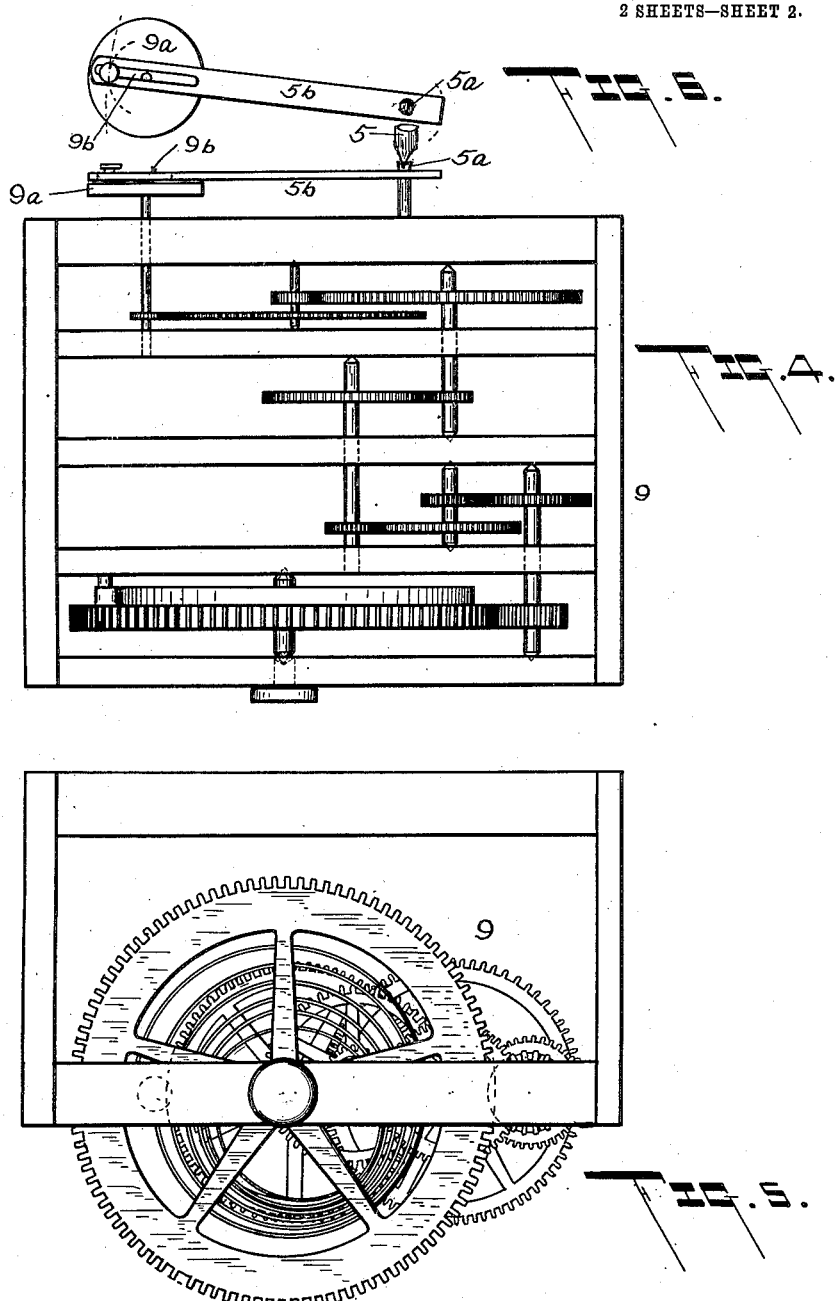

UNITED STATES PATENT OFFICE.

GEORGE C. McFARLANE, OF BAY CITY, MICHIGAN.

MERIDIAN-TRANSFER APPARATUS.

No. 812,587.  Specification of Letters Patent.  Patented Feb. 13, 1906.

Application filed October 17, 1903. Serial No. 177,504.

*To all whom it may concern:*

Be it known that I, GEORGE C. MCFARLANE, a citizen of the United States, residing at Bay City, in the county of Bay and State of Michigan, have invented certain new and useful Improvements in Meridian-Transfer Apparatus; and I do hereby declare the following to be a full, clear, and exact description of the invention, such as will enable others skilled in the art to which it appertains to make and use the same.

This invention is a meridian-transfer apparatus for the use of mining engineers and others who require to transfer a meridian-line obtained by observations taken above the ground to some place, such as the bottom of a mine, where it is impossible to make meridian observations *de novo*.

The object of the invention is to provide an instrument which can be set in exact parallelism with a given meridian and which by its mechanical arrangement is adapted to remain for a considerable time parallel with such meridian, notwithstanding the fact that the instrument may during this time be moved from place to place and be freely carried about by the operator.

While I shall illustrate and describe only one application of the mechanical principle involved—namely, its adaptation to a device for establishing meridian-lines in underground mine-work—yet it is evident that the same principle and the aquivalents of this device may be employed in different arts or wherever it is desired to keep an object, such as a telescope or other device, in a vertical plane parallel with the plane of its original position during a considerable length of time, although the instrument as a whole may be freely moved from one place to another during that time.

In practicing my invention I avail myself of the fact that the axis of rotation of a rapidly-rotating wheel or disk has by reason of its inertia a strong tendency to remain in any plane of rotation in which it is set and that considerable force must be exerted upon the axis of such rotating wheel in order to deflect it from its plane of rotation. If such a wheel is mounted in a yoke or frame so that the wheel shall revolve in a given plane and if any suitable instrument, such as a telescope, is also mounted on the frame, then if the telescope be sighted at right angles to the meridian—that is, if it be sighted along a due east and west line—considerable force must be exerted upon it to deflect its pivotal axis from the meridian, because of the tendency of the revolving wheel to keep its original plane of rotation. If now the yoke (carrying the telescope and the wheel) be mounted upon pivots, so that it can swing freely about a vertical axis to sweep the telescope through a horizontal plane, avoiding contact of the yoke with all external objects, all forces that might deflect the telescope while the wheel is revolving are eliminated, except the wind and friction on the pivots. Inclosing the yoke, telescope, and wheels in a suitable cover eliminates the wind deflection, and mounting the yoke-pivots on jeweled bearings almost entirely eliminates any friction that might tend to deflect the telescope and revolving wheel or disk. To more effectually nullify the friction on the pivots, means is provided for oscillating the jeweled bearings, giving them a rapid rotary movement first in one direction and then in another.

Having explained the general features of the invention, I will now describe the various constructions embodied in its application to a device for transferring meridian observations on the surface of the earth to the bottom of a mine-shaft or other place in which it is impossible to make direct meridian observations.

The device consists in the parts, their combinations, mode of operation, as set forth in the specification and claims of this application, and the equivalents thereof.

Reference is had to the accompanying drawings, in which—

Figure 1 is a front elevation of the instrument with the wind-shield removed. Fig. 2 is a sectional view taken on the line $x$ $x$ of Fig. 1. Fig. 3 is an enlarged plan view of the device for oscillating the lower pivot-bearing. Fig. 4 is a side elevation, on an enlarged scale, showing the gear mechanism to overcome the tendency to revolve the telescope when the outer frame is turned about its vertical axis. Fig. 5 is a bottom view of the same, and Fig. 6 is a top plan view of the arm and disk that oscillate the pivot-bearing.

The telescope 1 is mounted by means of suitable trunnions $1^a$ in a yoke or frame 2 of any suitable form. Upon the yoke 2 is also mounted a rotary disk 3, having a heavy rim to insure proper inertia. In practice I prefer to use two disks 3 3 side by side, as shown in Fig. 1. The disks are carried by a spindle $3^a$, the ends of which are revolubly mounted in suitable bearings $2^a$, formed in the frame 2. I prefer to make these bearings of any suitable antifrictional type of ball-bearing.

In the vertical axis of the frame 2 at its top is an upwardly-projecting pivot 4, and similarly the frame 2 has at its bottom a downwardly-projecting pivot 5. Upon the extremities of these two pivots 4 and 5 the weight of the yoke, telescope, and wheels or disks is supported and held vertcial. An outer frame 6 of metal, preferably of the same general contour as that of the yoke 2, serves to support the ends of the pivots 4 5, suitable bearings $4^a$ and $5^a$ being provided in the frame 6 for the purpose. A strap-clamp 7, of any suitable construction, carried by the frame 6, surrounds the pivot 5 and by means of a set-screw $7^a$ may be made to rigidly clamp the pivot 5 and prevent its rotation and that of the yoke 2 relatively to the frame 6.

The operation of the device is, as indicated at the beginning of this specification—that is, if the disks 3 are revolved very rapidly by any suitable means, such as a cord wound around the shaft $3^a$ and then rapidly unwound by pulling it, and if the telescope 1 is sighted at right angles to the meridian the inertia of the disks 3 tends to keep the pivotal axis of the telescope, which is at right angles to the line of sight, pointing in a direction parallel to that meridian, even though the outer frame 6 be moved from place to place. If the outer frame 6 is rotated about its vertical axis, no effect is produced to deflect the pivotal axis of the telescope 1 out of its meridian, except that due to friction or tenacity in the bearings $4^a$ and $5^a$, unless the instrument is disturbed by the wind.

To prevent wind effects, I mount on the frame 6 a pair of inclosing shells 8 $8^a$, which may be of thin metal and are preferably mounted on hinges, as at $6^a$, so that they may swing out of the way while the instrument is being set and may then be closed.

To overcome any possible tendency to deflect the telescope 1 when the outer frame 6 is slowly turned about its vertical axis, as may sometimes occur while it is being carried from place to place, I have devised a form of bearing shown in Figs. 3 and 6, the essential feature of which is that the bearing $5^a$, which is preferably a jeweled bearing, such as is commonly used in watches, shall oscillate about its axis, turning through part of a revolution in one direction and then turning through part of a revolution in the opposite direction, the revolutions taking place with considerable rapidity, after the manner of the balance-wheel of a watch. It is evident that during the first movement—say, to the right—a slight frictional twisting movement may be produced in the pivot 5 tending to deflect the telescope from the meridian; but this tendency is exeedingly slight and has very little, if any, effect on account of the inertia of the telescope, its yoke, and the revolving disks; but whatever tendency there is is immediately neutralized by the opposite rotation of the pivot when it oscillates to the left, so that the pivot 5, and consequently the telescope 1, is undisturbed by the slow rotation of the frame 6. Any suitable form of apparatus may be used for imparting the required oscillatory movement to the bearings $5^a$, and I do not desire to confine myself to any particular mechanism for that purpose. I prefer, however, to employ a spring-operated clock-train 9, as shown in Figs. 1, 4, and 5, in which $9^a$ is a revolving crank engaging a slot $9^b$ in the bearing-plate $5^b$. As the disk $9^a$ revolves it imparts the required oscillatory movement to the bearing-plate $5^b$ and to the bearing $5^a$, carried by it.

I prefer to mount the outer frame 6 in a U-shaped standard 10, which has a base 11, adapted to be mounted on a tripod provided with the usual horizontal circular plate, levels, and leveling-screws. A ring or hook 12 is fixed to the top of the frame 6, whereby the instrument may be carried always in a vertical position.

What I claim as my invention, and desire to secure by Letters Patent, is as follows:

1. In a device of the class described a pivotally-mounted sighting device, and a revolving disk operating in conjunction with said sighting device, said disk being adapted by its inertia to preserve parallelism of the sighting device the axes of the sighting device and of the disk being parallel.

2. The combination with a support, of a frame pivotally mounted on the support to rotate freely upon an axis normally perpendicular to the horizon, a sighting device pivotally mounted in said frame, a rotatable disk also mounted in said frame, the disk adapted by reason of its inertia to preserve the parallelism of the sighting device.

3. A frame revolubly mounted on vertical pivots only, a telescope carried by said frame and having its axis in a line intersected by the line of said pivots, and a disk revolubly mounted in said frame the axes of the disk and telescope being parallel.

4. The combination with an outer stationary frame, of an inner frame, a sighting device and a movable inertia member pivotally mounted in said inner frame, a pivot-support directly connecting the inner and outer frames and permitting movement of the inner frame only in a vertical plane and means for locking the frames together against relative movement.

5. The combination in a meridian-transferring mechanism provided with a pivotally-supported member, of means for counteracting the rotative tendency of the member, comprising a movable bearing on which the pivoted member is supported and means for imparting oscillatory movement to the bearing.

6. The combination in a device of the character set forth, of a pivoted member, rotary means carried by the member and tending to rotate the latter, a movable bearing in which the pivoted member is supported and means for constantly and automatically imparting an oscillatory movement to the bearing.

7. The combination in a device of the character set forth, with a pivoted member and movable means tending to rotate the member, of means for counteracting said tendency, comprising a movable bearing on which the member is pivotally supported, the bearing provided with a slot, an eccentric crank received in the slot, and means for imparting rotary movement to the crank.

In testimony whereof I affix my signature in presence of two witnesses.

GEORGE C. McFARLANE.

Witnesses:
W. I. CATHCART,
A. A. EASTERLY.